US008959272B2

(12) United States Patent
Lamm et al.

(10) Patent No.: US 8,959,272 B2
(45) Date of Patent: Feb. 17, 2015

(54) INTERPOSER AND INTELLIGENT MULTIPLEXER TO PROVIDE A PLURALITY OF PERIPHERIAL BUSES

(75) Inventors: Mark Peter Lamm, Mississauga (CA); John Ivan Scharkov, Toronto (CA); Omar George Joseph Barake, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 208 days.

(21) Appl. No.: 13/543,091

(22) Filed: Jul. 6, 2012

(65) Prior Publication Data

US 2014/0013024 A1   Jan. 9, 2014

(51) Int. Cl.
| G06F 13/20 | (2006.01) |
| G06F 13/40 | (2006.01) |
| H01R 13/46 | (2006.01) |
| G06F 13/38 | (2006.01) |
| H01R 27/02 | (2006.01) |
| H01R 31/06 | (2006.01) |

(52) U.S. Cl.
CPC ............ *G06F 13/4022* (2013.01); *H01R 13/46* (2013.01); *G06F 13/385* (2013.01); *H01R 27/02* (2013.01); *H01R 31/06* (2013.01); *H01R 2201/06* (2013.01)
USPC ..................................... 710/313; 3/62; 3/300

(58) Field of Classification Search
CPC .............. G06F 13/385; G06F 13/4022; G06F 13/4027; G06F 13/362; G06F 13/365
USPC .......... 710/300–317, 62–64, 72–73
See application file for complete search history.

(56) References Cited

U.S. PATENT DOCUMENTS

| 7,749,028 | B2 | 7/2010 | Feridani et al. |
| 7,865,629 | B1 | 1/2011 | Tantos et al. |
| 8,176,214 | B2 * | 5/2012 | Jones et al. ...................... 710/14 |
| 8,504,823 | B2 * | 8/2013 | Carpenter et al. ............. 713/158 |
| 8,517,772 | B2 * | 8/2013 | Wu ................................. 439/638 |
| 8,651,368 | B2 * | 2/2014 | Slaby et al. .................... 235/375 |
| 2003/0124999 | A1 | 7/2003 | Parssinen et al. |
| 2009/0108848 | A1 | 4/2009 | Lundquist et al. |
| 2009/0215320 | A1 | 8/2009 | Feridani et al. |
| 2009/0300243 | A1 * | 12/2009 | Chao ............................... 710/71 |
| 2010/0132004 | A1 | 5/2010 | Ota et al. |
| 2010/0231397 | A1 * | 9/2010 | Ke .................................. 340/654 |
| 2011/0125601 | A1 * | 5/2011 | Carpenter et al. ............ 705/26.1 |
| 2012/0252277 | A1 * | 10/2012 | Wu ................................. 439/638 |

OTHER PUBLICATIONS

Amazon.com Search Results for "hdmi usb 3.0 converter", Aug. 26, 2011.

(Continued)

*Primary Examiner* — Raymond Phan
(74) *Attorney, Agent, or Firm* — Jon A. Gibbons; Fleit Gibbons Gutman Bongini & Bianco P.L.

(57) ABSTRACT

A communication connector is described that provides an increase in the number and type of communication circuits available on an electronic device without increasing the number and type of physical connectors. The communication connector electrically includes a set of inputs to couple to both a USB 2.0 connector and a HDMI connector. A set of outputs from the communication connector provides a third connector with a pin out specification compatible with a USB 3.0 connector or a PCIe connector.

21 Claims, 7 Drawing Sheets

(56) References Cited

OTHER PUBLICATIONS

Sedna Advanced Electronics Ltd., Your Partner for Computer & Digital Consumer Products, Model No: SE-USB3-HDMI-32; Portable Usb 3.0 HDMI Adapter, copyright 2011 Sedna Advanced Electronics Ltd.

EESR dated Nov. 22, 2012 for European Patent Application No. 12175410.05.

* cited by examiner

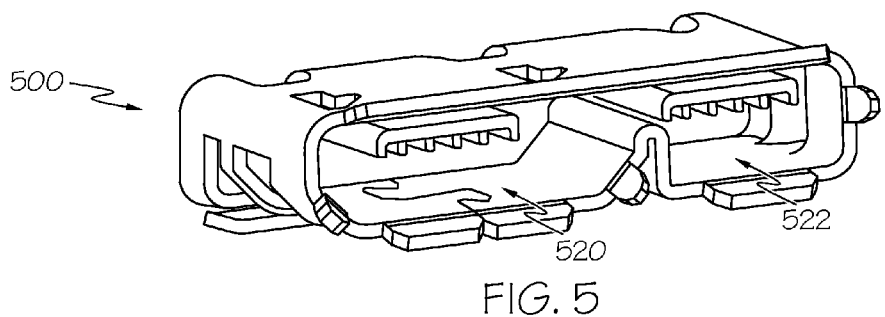

FIG. 5

| INTERPOSER PIN ASSIGNMENT | | |
|---|---|---|
| | microHDMI 610 / 640 / 644 | microUSB 620 / 648 |
| PIN NUMBER | EXISTING, INDUSTRY STANDARD DEFINITION | INTERPOSER DEFINITION |
| MICROHDMI1 | HOT PLUG DETECT (HPD) | LOW SPEED 5 |
| MICROHDMI2 | HDMI RESERVED | LOW SPEED 4 |
| MICROHDMI3 | D2+ | HIGH SPEED D+ |
| MICROHDMI4 | GND | GND |
| MICROHDMI5 | D2- | HIGH SPEED D- |
| MICROHDMI6 | D1+ | HIGH SPEED C+ |
| MICROHDMI7 | GND | GND |
| MICROHDMI8 | D1- | HIGH SPEED C- |
| MICROHDMI9 | D0+ | HIGH SPEED B+ |
| MICROHDMI10 | GND | GND |
| MICROHDMI11 | D0- | HIGH SPEED B- |
| MICROHDMI12 | CLK+ | HIGH SPEED A+ |
| MICROHDMI13 | GND | GND |
| MICROHDMI14 | CLK- | HIGH SPEED A- |
| MICROHDMI15 | CEC | LOW SPEED 3 |
| MICROHDMI16 | GND | GND |
| MICROHDMI17 | SCL | LOW SPEED 2 |
| MICROHDMI18 | SDA | LOW SPEED 1 |
| MICROHDMI19 | HDMI PWR +5V | PWR |
| MICROUSB1 | USB PWR | USB PWR |
| MICROUSB2 | D- | D- |
| MICROUSB3 | D+ | D+ |
| MICROUSB4 | ID | ID |
| MICROUSB5 | USB GND | USB GND |

(MICROHDMI1–MICROHDMI19: 611; MICROUSB1–MICROUSB5: 612)

INTERPOSER AND INTELLIGENT MULTIPLEXER TO PROVIDE A PLURALITY OF PERIPHERIAL BUSES

FIELD OF THE DISCLOSURE

The present disclosure generally relates to data communications buses, and more particularly to communication buses that provide High-Definition Multimedia Interface® (HDMI), Universal Serial Bus® (USB), and Peripheral Component Interconnect Express® (PCIe) compatible interfaces.

BACKGROUND

Electronic devices are incorporating increasing amounts of data processing capabilities in increasingly smaller form factors. For example, portable devices are able to produce high resolution video data streams from either stored data or data received through either a wired or wireless data communications circuit. Portable electronic devices are increasingly able to process or create large volumes of data that are able to be provided to external data systems, such as storage or display devices. Such large volumes of data are sometimes communicated through special data interfaces or peripheral bus connectors to the device, causing several connectors to be generally required to provide high speed data communications and other electrical data communications interfaces, such as power or legacy data interfaces. Each peripheral bus connector of an electronic device introduces costs, and product reliability concerns.

Further, current design trends require smaller and smaller form factors and an increasing number of peripheral bus standards to support. For example, peripheral bus connectors, such as, Universal Serial Bus® (USB) 2.0 and High-Definition Multimedia Interface® (HDMI), are common. However, other peripheral bus connectors, such as USB 3.0 and Peripheral Component Interconnect Express® (PCIe), are often demanded by consumers. A tradeoff is typically made. On one side of the tradeoff, the industrial designers try to limit the number and type of peripheral bus connectors in an electronic product because of space and costs and to provide a sleek appearance. On the other side of the tradeoff, consumers demand the integration of additional peripheral bus connectors into electronic devices.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 is a USB Micro B Connector showing the USB 2.0 and USB 3.0 portions;

FIG. 6 is a pin out specification for the peripheral bus interposer of FIG. 4 with the input set of Micro USB 2.0 and Micro HDMI (Type D);

DETAILED DESCRIPTION

Figure 1:
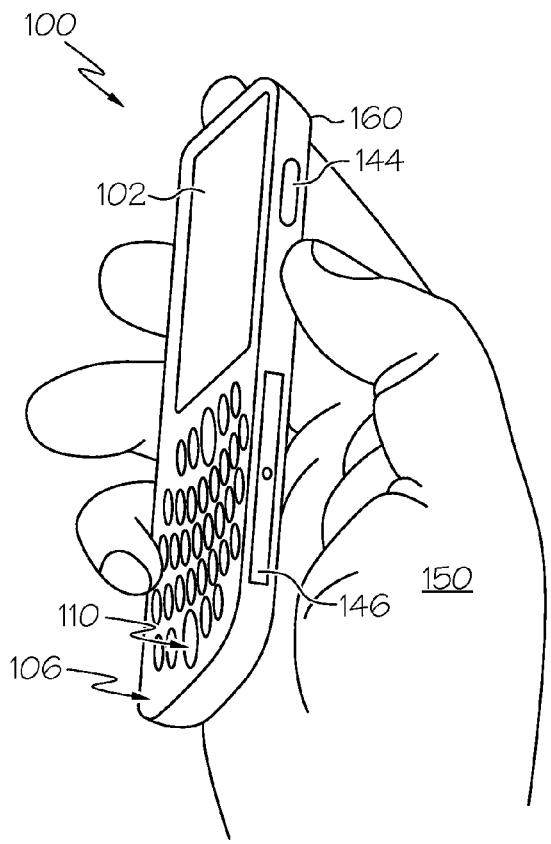
FIG. 1 and FIG. 2 are electronic devices with connectors for communication ports.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "connector" is used to denote a physical connector, such as a receptacle or plug, used with a peripheral bus.

In one example a communication connector or interposer is described that provides an increase in the number and types of external communication ports available on an electronic device without increasing the number and types of external physical connectors. At least four (4) peripheral bus interfaces HDMI, USB 2.0, USB 3.0 and PCIe are possible from only two (2) physical connectors HDMI and USB 2.0. The interposer/cable includes a USB 2.0 connector and an HDMI connector. An output from the interposer/cable provides a third connector with a pin out specification compatible with a USB 3.0 connector. In one example, a set of conductors in the HDMI connector are repurposed or reassigned to carry high speed signals to a set of conductors in the USB 3.0 connector that are compatible with the USB 3.0 interface.

In another example an electronic device with a selectable internal switch is described. The switch, in one example, reassigns a set of conductors in the HDMI bus to carry high speed signals to a set of conductors in the USB 3.0 connector that are compatible with the USB 3.0 interface. In another example the switch reassigns a set of conductors in the HDMI bus to carry high speed signals to a set of conductors in the PCIe connector that are compatible with the PCIe interface.

The switch has at least two inputs. The first input is coupled to a first set of conductors compatible with an HDMI interface. The second input is coupled to a second set of conductors compatible with an USB version 3.0 interface. And, an optional, third input is coupled to a third set of conductors compatible with a PCIe interface. The switch has an output with a fourth set of conductors.

A control input to the switch receives a control signal to selectively couple one of the first set of conductors, the second set of conductors, and the third set of conductors to the fourth set of conductors of the bus output.

In one example, high speed signals from HDMI, USB 3.0 and PCIe are coupled to the switch and routed to an external HDMI compatible connector. Other non-high speed signals are coupled to the external HDMI and USB 2.0 compatible connectors.

Electronic Device with Micro HDMI and Micro USB Connector

Figure 3:
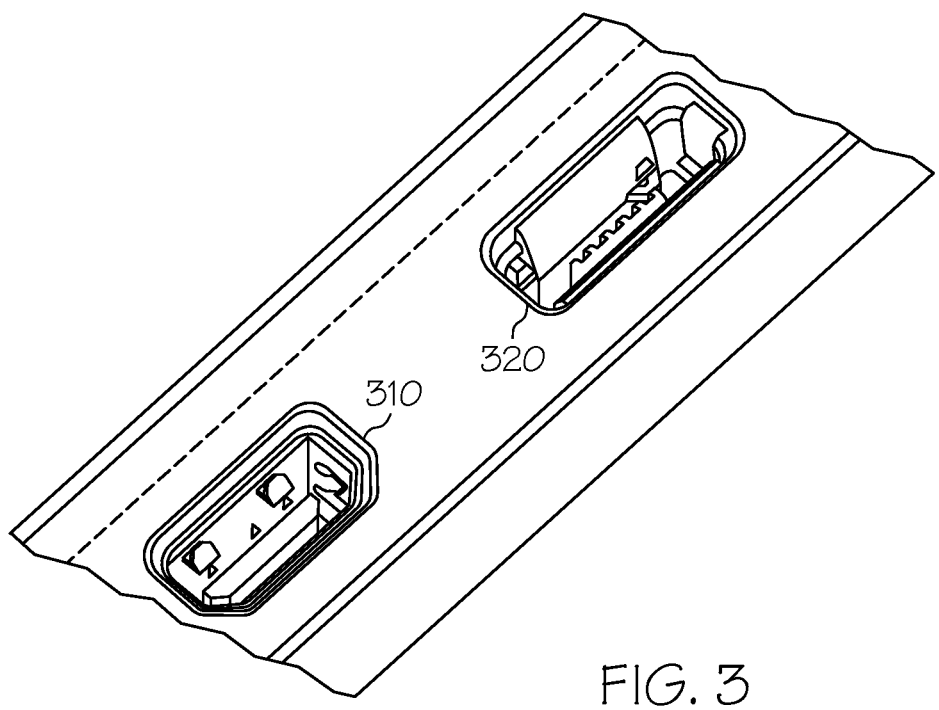
FIG. 3 is an enlarged example of the connectors of FIG. 1 and FIG. 2.

With reference to FIG. 1, an electronic device 100 includes a front side 106 having a display 102, and a back side 160. A user 150 is holding the electronic device 100 so that the display 102 is viewable. A keyboard, such as a mechanical keyboard 110 is provided (although a touch-sensitive keyboard may be suitable), operative in cooperation within one or more processors described further below. In FIG. 1, keyboard 110 is positioned to occupy a portion of first side 106, although keyboard 110 may fold and/or slide out from within the electronic device 100. One or more openings 144 and 146 may provide access to a SIM card, battery, storage or memory expansion, connectors, or any other feature of the electronic device 100, including for example, an additional slide-out display, or a touchpad, keypad, camera lens, camera flash, microphone, or stand. An example of connectors in the opening 144 and 146 are shown in FIG. 3.

Figure 2:
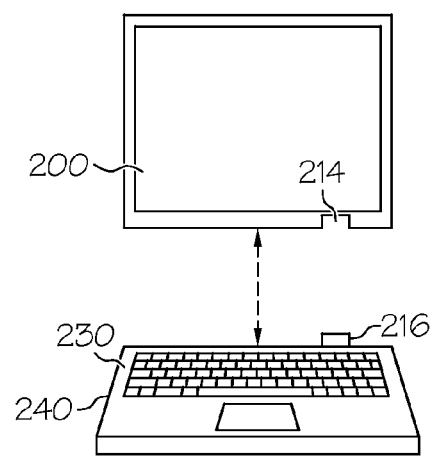

In FIG. 2, an electronic device 200 without the mechanical keyboard 110 is electrically and mechanically coupled to a docking station 240. An opening 214 in the side of electronic device 200, analogous to opening 144 of FIG. 1, has a connector for coupling with the docking station 240. The docking station 240 in this example includes a full size mechanical keyboard 230 and an HDMI plug 216. The example connector shown in FIG. 3 is an enlarged example of the connectors in the openings 144 of FIG. 1 and the opening 214 of FIG. 2. A receptacle, Micro HDMI connector 310 is shown with pin out specification compatible with HDMI. Also shown is a receptacle, Micro USB Connector 320, with pin out specification compatible with USB 2.0.

Interposer/Cable or Dongle

Figure 4:
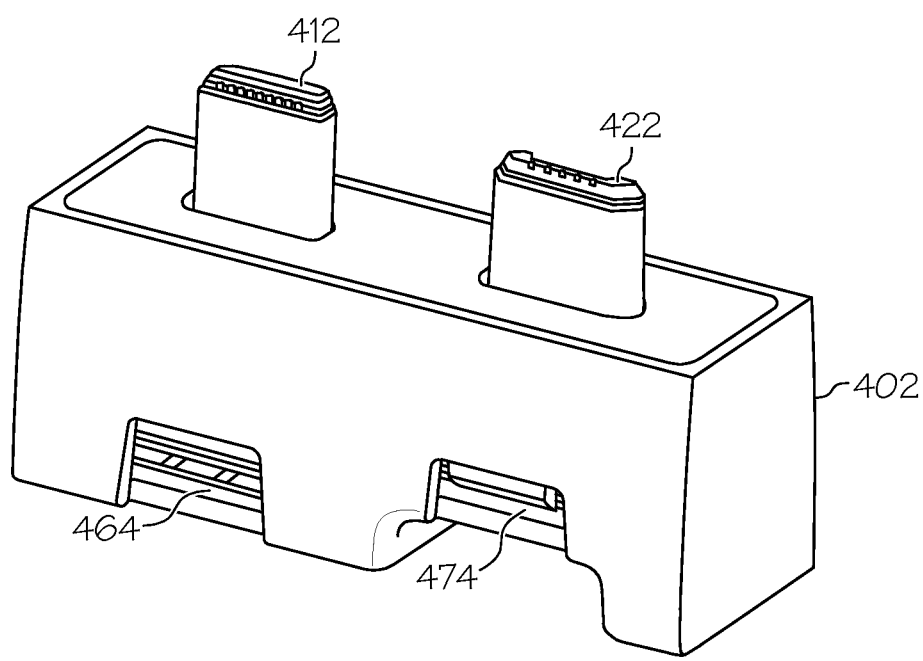
FIG. 4 is a peripheral bus interposer.

An example peripheral bus interposer 402 is shown in FIG. 4. In this example, the electrical circuit connector or peripheral bus interposer 402 includes an HDMI plug 412 with pin out specification compatible to couple with the receptacle, Micro HDMI connector 310. Likewise USB plug 422 is provided with pin out specification compatible to couple with the receptacle, Micro USB 2.0 connector 320. Two outputs are shown 464 and 474. In this example, output connector 464 is a receptacle, Micro HDMI connector, with a pin out specification compatible with HDMI. Output connector 474 is a receptacle, Micro USB 3.0 connector, with pin out specification compatible with USB 3.0. FIG. 5 illustrates the Micro USB 3.0 connector in greater detail. Due to the sharing of signal lines through a multipler/switch, only one of the two outputs 464, 474, are typically usable at any given time as explained below with reference to FIG. 7 and FIG. 9

In another example, the output connector 474 is a PCIe connector compatible with PCIe. In still other embodiments, the peripheral bus interposer 402 includes outputs for both PCIe and USB 3.0 as well as output for HDMI (not shown).

In still another example, an electrical circuit connector is a Y-type connector with a cable, or hardware "dongle", with two plugs on one end of the cable and typically at least one receptacle on the other end of the cable. The first plug includes a pin out specification compatible to couple with the receptacle, Micro HDMI connector 310. The second plug includes a pin out specification compatible to couple with the receptacle, Micro USB 2.0 connector 320. On the other end, a USB 3.0 connector 500 is formed.

FIG. 5 is a receptacle, USB Micro Connector 500 showing the USB 2.0 portion 520 and USB 3.0 portion 522. Notice this connector 500 has an additional portion 522 to provide the higher speed signal pins according to the USB 3.0 standards. These higher speed signal pins are described with reference to the pin out specification of FIG. 6. For quick reference, a Micro HDMI connector 610, identical to HDMI connector 310 of FIG. 3 is shown. Also shown is a Micro USB 2.0 connector 620, identical to Micro USB 2.0 Micro connector 320. The pin out specification is divided into a top section 611 and bottom section 612. The top section 611 of the pin out specification are rows 1-19 for a HDMI Micro connector and the bottom section 612 are rows 1-5 for a USB 2.0 Micro connector.

More specifically, column 640 lists the pin number in the specification for Micro HDMI connector 610 and Micro USB 2.0 connector 620. Column 644 is the pin specification or description of the industry standards for Micro HDMI connector 610 and Micro USB 2.0 connector 620. Column 648 is the HDMI pins reassigned or repurposed to provide high speed lines for USB 3.0 or PCIe.

Electronic Device With Multiplexer

Figure 7:
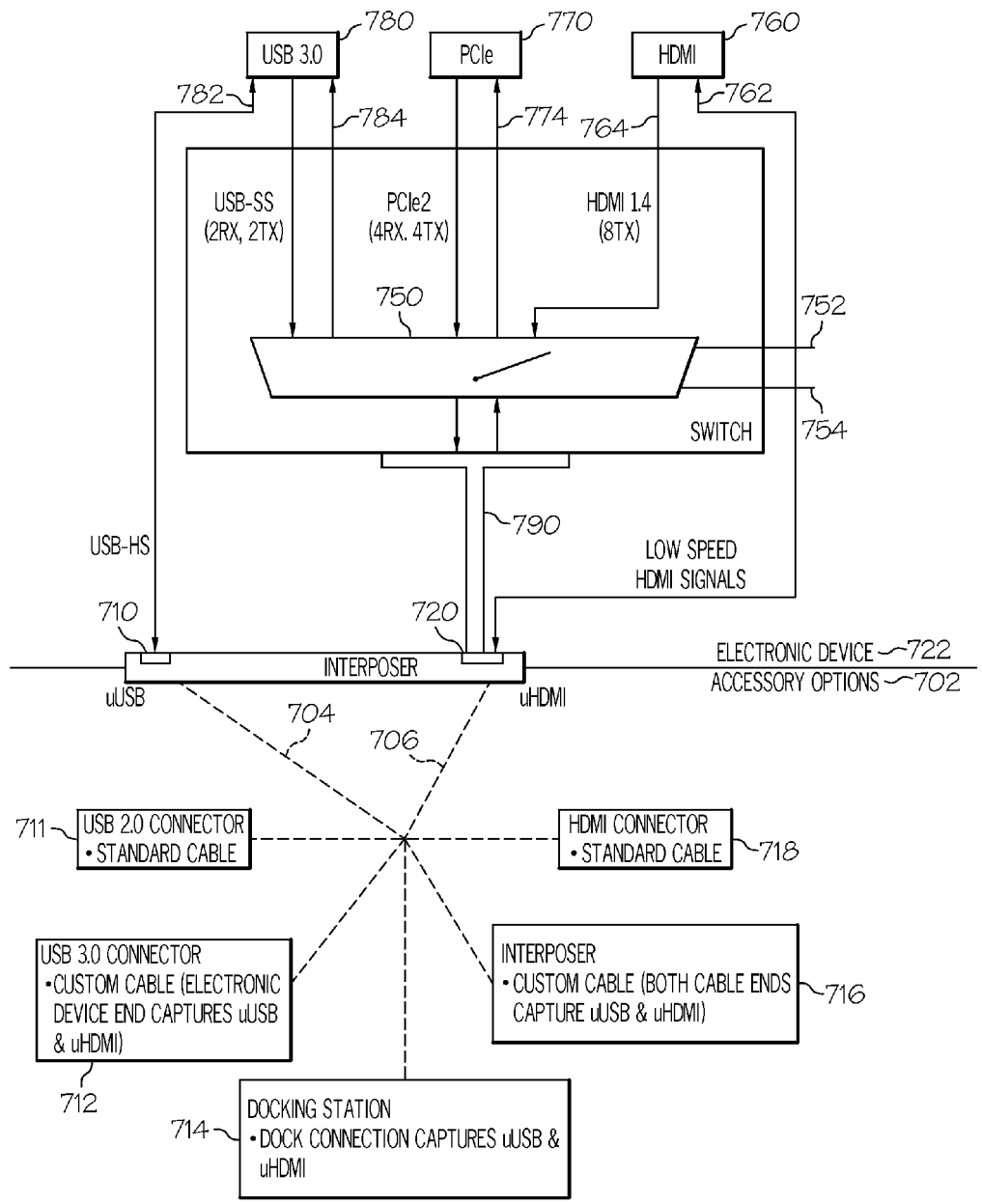
FIG. 7 is a functional diagram of an electronic device with a multiplexer coupling to the peripheral bus interposer of FIG. 4 or a docking station of FIG. 2.
Figure 8:
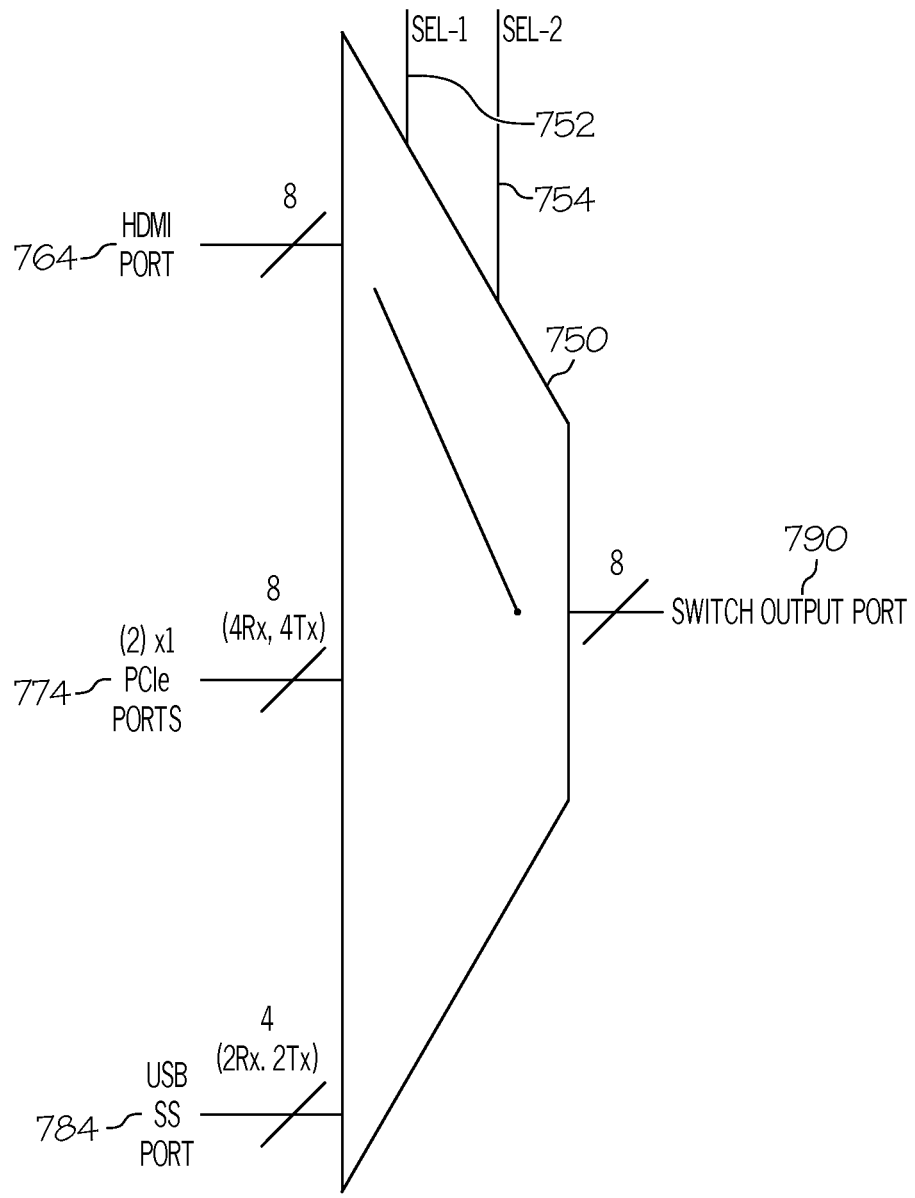
FIG. 8 is a diagram of the multiplexer of FIG. 7.

FIG. 7 is a functional diagram 700 of an electronic device of FIG. 1 or FIG. 2 with a multiplexer 750 coupling to the peripheral bus interposer/cable of FIG. 4 or a docking station 240 of FIG. 2. More specifically, the upper portion 722 of the diagram is a functional diagram of the switch or multiplexer 750 inside the electronic device of FIG. 1 or FIG. 2. The lower portion is a functional diagram 702 of the various peripheral buses available—HDMI, USB 2.0, USB 3.0, and PCIe. The details of multiplexer 750 are shown in FIG. 8.

Referring now to the upper portion 722, the switching function of the multiplexer 750 is described. The multiplexer 750 performs switching, in one example, using a high bandwidth multiplexer, similar to existing multiplexer used to switch between several sets of HDMI inputs into a high definition TV. In one example the multiplexer 750 switches only four (4) signals away from HDMI to either USB-SS function or PCIe2 function. In one example, the PCIe2 function is implemented as 1 lane (=2RX and 2TX) to switch 4 signals. And in another example, the PCIe2 function is implemented as 2 lanes (4RX and 4TX) to switch 8 signals. However all eight (8) fast HDMI signals are run through the multiplexer 750 so the impact of the multiplexer 750 on the electrical characteristics of the HDMI signals is uniform. In this example, the remaining slower signals that are part of Micro-HDMI pin 1, 15, 17, 18(=HPD, CEC, DDC CLK, DDC Data) do not go through the switch 750 and hence bypass it; in the USB or PCIe switch configurations these are not used.

Three sets of bus inputs 760, 770, 780 are shown. A portion 764 of a first set of conductors of the first bus input 760 that are compatible with HDMI are coupled to multiplexer 750. In one example, the portion 764 of the first conductors of the first bus 760 are eight (8) data and clock lines. The exact line mapping is illustrated in FIG. 6 with reference to columns 644 and 648. The eight MicroHDMI pin numbers are 3, 5, 6, 8, 9, 11, 12, and 14. The other portion 762 of the first set of conductors are coupled to the HDMI conductors in the Micro-HDMI connector 720. Again, the exact line mappings are illustrated in FIG. 6 with reference to columns 644 and 648. The eleven (11) pins are 1, 2, 4, 7, 10, 13, 15, 16, 17, 18, and 19.

The second bus input 770 includes a set of a second set of conductors compatible with PCIe. In this example, the second set of conductors are coupled to multiplexer 750. Unlike the HDMI 760 and USB 780, in this example, no other portion of the second set of conductors is coupled to the HDMI conductors in the MicroHDMI connector 720. Stated differently, in this example, all the second set of conductors, eight (8) in total, are coupled to the multiplexer 750. However, in another example, a portion of the conductors in the second set of conductors may by-pass the multiplexer 750.

The third bus input 780 includes a set of a third set of conductors compatible with USB 3.0, with a portion 784 of the third set of conductors coupled to multiplexer 750. In this example, the portion 784 of the third set of conductors of the third bus is four (4) high speed data lines. The other portion 782 of the third set of conductors are coupled to the USB conductors in the MicroUSB connector 710. Again, the exact line mappings are illustrated in FIG. 6 with reference to columns 644 and 648. The five (5) MicroUSB 2.0 pins are 1, 2, 3, 4, and 5.

Multiplexer 750 selectively switches a portion of the conductors from either HDMI bus 764, USB 3.0 bus 774, or the PCIe bus 784 to output conductors 790 via control signals 752, and 754. The output conductors 790 are coupled to some of the conductors in HDMI conductors in the MicroHDMI connector 720. As a result, when either the portion of the USB 3.0 bus 784 or the PCIe bus 774 are selected with switch 750, the HDMI pins in MicroHDMI connector 720 are reassigned or repurposed to provide high speed lines for USB 3.0 or PCIe.

Coupling Accessories to Electronic Device

Turning now to the lower portion 702 of FIG. 7, the MicroUSB 2.0 connector 710 and MicroHDMI connector 720 are now described with and without the interposer/cable 402. Four (4) peripheral bus interfaces HDMI, USB 2.0, USB 3.0 and PCIe are possible. These four peripheral buses are supplied through two connectors: 1) Micro USB 2.0 connector 704; 2) and MicroHDMI connector 706.

Mode 1—USB 2.0 and HDMI—Interposer/cable 402 and No Docking Station 240

In this mode, the interposer/cable 402 is not used and the USB 2.0 interface is supplied through MicroUSB 2.0 connector 710 to external devices 711 Likewise, the HDMI interface is supplied through MicroHDMI connector 720 to external devices 718.

Mode 2—USB 3.0 using Interposer/cable 402 and No Docking Station 240

In order to supply a compatible USB 3.0 interface both conductors in the USB 2.0 MicroUSB 2.0 connector 710 and the MicroHDMI connector 720 are used for accessory 712. The portion of the conductors, typically the high speed data and clock lines, of the USB 3.0 bus 784 are connected via multiplexer 750 to the conductors of MicroHDMI connector 720. The receptacle 474, of interposer/cable 402, provides the Micro USB 3.0 connector 500. Conductors for the "SuperSpeed" portion 522 of the Micro USB 3.0 connector 500 are supplied via the multiplexer 750 to the reassigned pins in the MicroHDMI connector 720. More specifically in this example, the high speed portion 522 of the Micro USB 3.0 connector 500 are routed through the multiplexer 750. The low speed signals are connected from the USB 3.0 bus 780 to MicroUSB 2.0 connector 710. These are combined to form each side 520 and 522 of the Micro USB 3.0 connector. The four high speed lines from MicroHDMI connector 720, are used to carry USB 3.0 "SuperSpeed" lines, defined by the USB 3.0 specification as a differential transmit (TX) and receive (RX) pair at 5 Gbps in one direction and a differential transmit (TX) and receive (RX) pair in the other direction. For more information on HDMI refer to online URL (http://en.wikipedia.org/wiki/HDMI) and for more information on USB 2.0 and 3.0 see online URL (http://en.wikipedia.org/wiki/Usb). The teachings of each of these references are incorporated by reference in their entirety.

Mode 3—PCIe using Docking Station 240 and No Interposer/cable.

In this mode, the interposer/cable 402 is not used and docking station 240 is used as assessor 714. As described in FIG. 9 below, in one example the electronic device 100 or 200 detects the use of docking station 240 to supply PCIe interface when PCIe is available for use by the docking station 240, otherwise HDMI is the default. In order to supply a compatible PCIe interface conductors in the HDMI connector 706 are reassigned. The portion of the conductors, typically the high speed data known as "lanes", of the PCIe bus 774 are connected via multiplexer 750 to the conductors of Micro-HDMI connector 720. The docking station 240 with the HDMI plug 216 compatible with the receptacle for HDMI 474, provides the PCIe. More specifically, conductors for the high speed portion of PCIe 774 are supplied via the multiplexer 750 to the reassigned pins in the MicroHDMI connector 720. For example, the eight high speed lines from Micro-HDMI connector 720, are used to carry two PCIe "lanes", defined by the PCIe specification as TX0+, TX0−, RX0+, RX0−, TX1+, TX1−, RX1+, RX1−. In one example, the "lanes" are TX0+, TX0− for the transmit differential pairs and RX0+, RX0− for the receive differential pairs, defined as Lane 0 and TX1+, TX1− for the transmit differential pairs and RX1+, RX1− for the receive differential pairs, defined as Lane 1. For more information on PCIe refer to online URL (http://en.wikipedia.org/wiki/PCIe). The teachings of this reference is incorporated by reference in its entirety.

This reconfiguration is the switching of the multipler 750 described above. If the electronic accessory is found to need either USB 3.0 or PCIe signals, the electronic device changes the state of the switch 750 to either of these 2 alternate (non-HDMI) options. Immediately USB 3.0 or PCIe signals will start passing through the switch 750 and the accessory will start receiving them. Both the USB 3.0 and PCIe are defined by the industry specification that as soon as the signals are seen by both sides a link can be setup. So the reconfiguration is handled by changing the state of the switch 750 through switching the select lines 752, 754 and sending the correct signals, USB 3.0 or PCIe into an accessory that is waiting for them. It should be understood from this flow chart in FIG. 9, that the use of the switch 750 provides at least four (4) peripheral bus interfaces HDMI, USB 2.0, USB 3.0 and PCIe from only two (2) physical connectors HDMI and USB 2.0.

Flow Diagram

Figure 9:
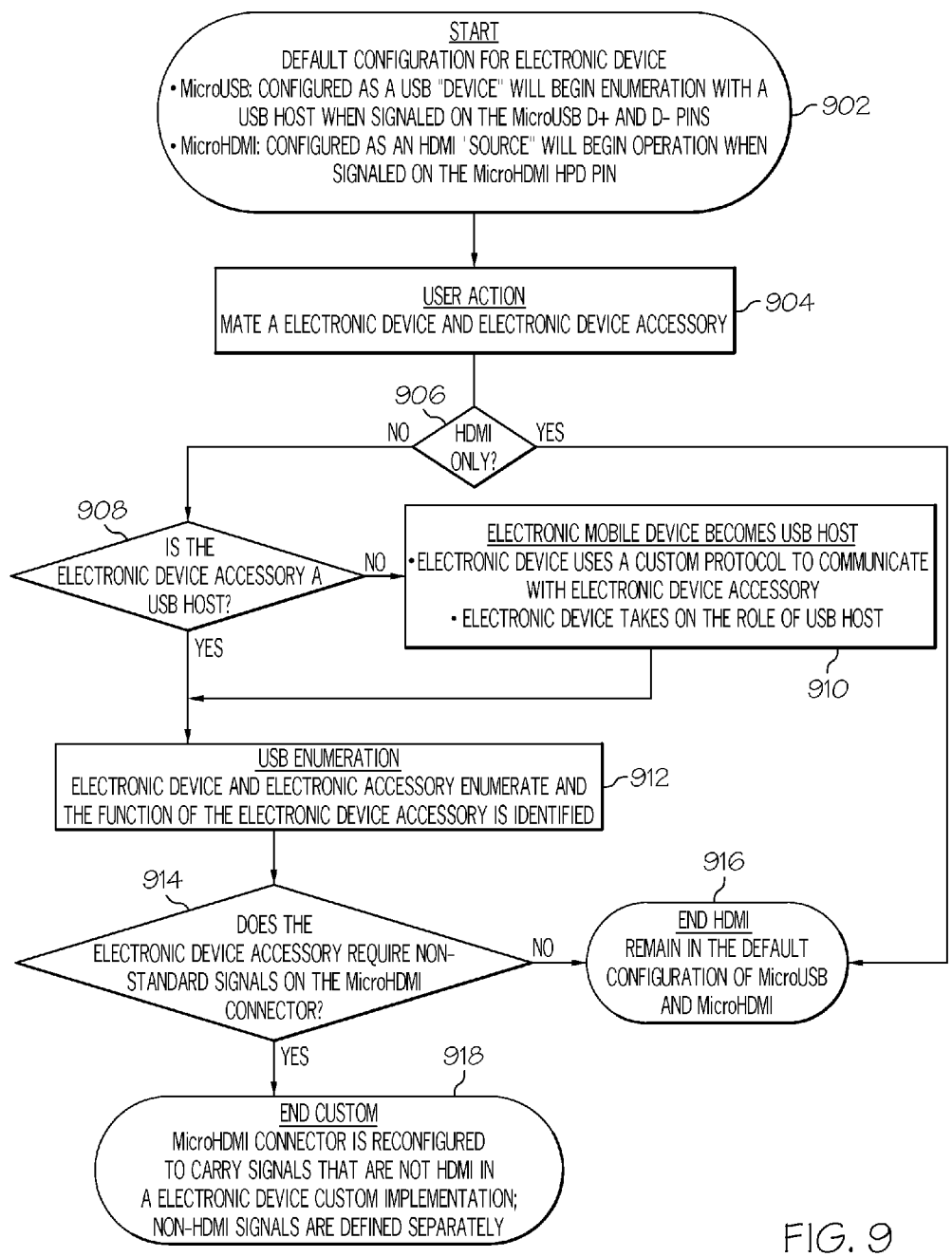
FIG. 9 is a flow diagram of enumerating signal connections through the multiplexer of FIG. 8 when the peripheral bus interposer is coupled or the electronic device is in a docking station.

FIG. 9 is a flow diagram of enumerating signal connections through the multiplexer of FIG. 7 and FIG. 8. The process begins in step 902, which is the default configuration of the device of HDMI and USB 2.0 and on connectors 310 and 320 respectively. The switch 750 through select lines 752, 754, is set to HDMI bus 760. More specifically, Micro USB Connector 320 operates with a USB host device when signaled on the pins MicroUSB2 "D−" and MicroUSB2 "D+". Micro HDMI connector 310 is configured as an HDMI "source" when signaled on MICROHDMI1 Hot Plug Detect (HPD) pin by an external display.

At step 904, a test is made whether the electronic device 100 or 200, is either coupled with i) interposer/cable 402, ii) docked to docking station 230, or iii) either a USB 2.0 and/or HDMI device is attached. The process continues to step 906 where a test is made whether just only HDMI is connected. In the case where only HDMI is connected, the process continues to step 914 where the default configuration of switch 750 is set to HDMI.

In the case where something is plugged into MicroUSB 2.0 connector 710, the process continues to step 908. Another test is made to determine whether the electronic device accessory is a USB host. In the case where the accessory is the USB host, such as an external computer, or laptop, the process continues to step 910 in which the electronic device of FIG. 1 or FIG. 2 operates as a "non-host" or "device" with the device accessory and communicates over USB 2.0 through interposer/cable 402. The process continues to step 910 for USB enumeration.

In the case in step 908 in which the electronic device is operating as a USB host, the process continues to step 912 in which the electronic device 100 or 200 and the accessory, exchange information under USB enumeration function of devices abilities. More information on USB enumeration can be found at online URL (http://www.1vr.com/usbcenum-.htm) the teachings of which are incorporated by reference in their entirety.

The process continues to step 914 in which the capabilities of the device are determined, such as, whether USB 3.0 is available and/or PCIe. And in the case that the device is capable of PCIe, such as a docking station 240, the process continues to step 918, the multiplexer 750 is switched the select lines 752, 754 to PCIe and the process reassigns pins from the MicroHDMI connector 720 to PCIe bus 774 to carry signals that are not HDMI signals.

In the case, USB 3.0 is available, the process continues to step 918, the multiplexer 750 switches the select lines 752, 754 to USB 3.0 and the process reassigns pins from the MicroHDMI connector 720 to USB bus 784 to carry signals that are not HDMI signals.

Otherwise, the process continues to step 916 in which the multiplexer 750 remains connected to HDMI and the pins from the MicroHDMI connector 720 carry signals from the HDMI bus 762.

EXAMPLE DIAGRAM ELECTRONIC DEVICE

Figure 10:
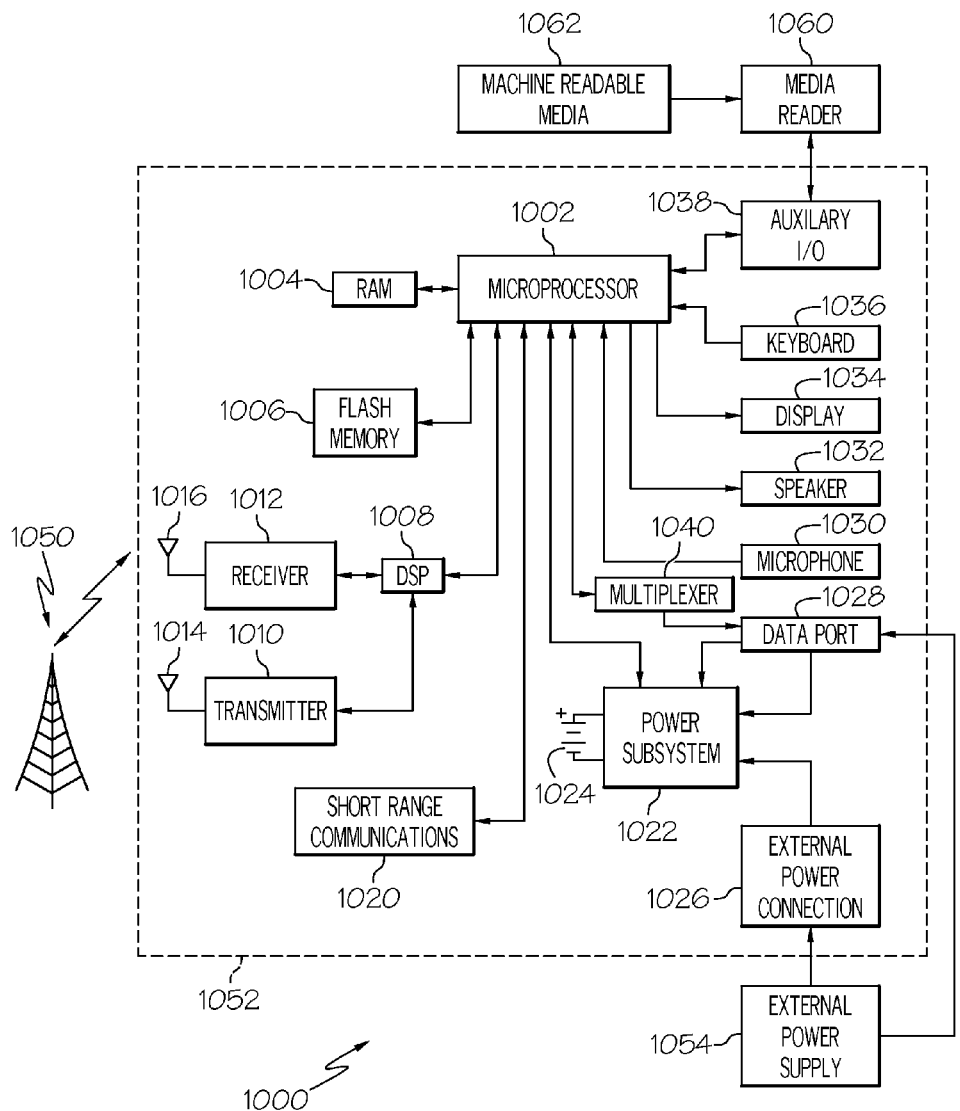
FIG. 10 is a functional diagram of electronic devices of FIG. 1 and FIG. 2.

FIG. 10 is a functional diagram 1000 of an electronic device of FIG. 1 and FIG. 2. In this example, a handheld electronic device 1052 is a wireless two-way communication device with voice and data communication capabilities. Such electronic devices communicate with a wireless voice or data network 1050 using a suitable wireless communications protocol. Wireless voice communications are performed using either an analog or digital wireless communication channel or combination thereof. Data communications allow the handheld electronic device 1052 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated handheld electronic device 1052 is an example electronic device that includes two-way wireless communications functions. Such electronic devices incorporate communication subsystem elements such as a wireless transmitter 1010, a wireless receiver 1012, and associated components such as one or more antenna elements 1014 and 1016. A digital signal processor (DSP) 1008 performs processing to extract data from received wireless signals and to generate signals to be transmitted. The particular design of the communication subsystem is dependent upon the communication network and associated wireless communications protocols with which the handheld electronic device is intended to operate.

The handheld electronic device 1052 includes a microprocessor 1002 that controls the overall operation of the electronic device 1052. The microprocessor 1002 interacts with the above described communications subsystem elements and also interacts with other device subsystems such as flash memory 1006, random access memory (RAM) 1004, auxiliary input/output (I/O) device 1038, data port 1028, display 1034, keyboard 1036, speaker 1032, microphone 1030, a short-range communications subsystem 1020, a power subsystem 1022, and any other device subsystems.

A battery 1024 is connected to a power subsystem 1022 to provide power to the circuits of the electronic device 1052. The power subsystem 1022 includes power distribution circuitry for providing power to the handheld electronic device 1052 and also contains battery charging circuitry to manage recharging the battery 1024. The power subsystem 1022 includes a battery monitoring circuit that is operable to provide a status of one or more battery status indicators, such as remaining capacity, temperature, voltage, electrical current consumption, and the like, to various components of the electronic device 1052.

The data port 1028 is able to support data communications between the handheld electronic device 1052 and other devices through various modes of data communications, such as high speed data transfers over an optical communications circuit or over electrical data communications circuits such as a USB connection incorporated into the data port 1028 of some examples. A multiplexer 1040, such as that shown in FIG. 6 and FIG. 7 is electrically coupled to the data port 1028. In one example, the multiplexer 1040 and data port 1028 is able to support communications with, for example, an external computer or other device. The data port 1028 in one example is electrically coupled with multiplexer 1040 to connectors 310 and 320. In one example the dataport 1028 is coupled to the Micro HDMI connector 310 with pin out specification compatible with HDMI shown in FIG. 3 and a Micro USB connector 320 with pin out specification compatible with USB 2.0 also shown in FIG. 3.

Operating system software used by the microprocessor 1002 is stored in flash memory 1006. Further examples are able to use a battery backed-up RAM or other non-volatile storage data elements to store operating systems, other executable programs, or both. The operating system software, device application software, or parts thereof, are able to be temporarily loaded into volatile data storage such as RAM 1004. Data received via wireless communication signals or through wired communications are also able to be stored to RAM 1004. In one example, the software to carry out the steps in FIG. 9 to operate the select lines 752, 754 of the switch 750, is stored in flash memory 1006.

The microprocessor 1002, in addition to its operating system functions, is able to execute software applications on the electronic device 1052. A predetermined set of applications that control basic device operations, including at least data and voice communication applications, is able to be installed on the handheld electronic device 1052 during manufacture. Examples of applications that are able to be loaded onto the handheld electronic device may be a personal information manager (PIM) application having the ability to organize and manage data items relating to the handheld electronic device user, such as, but not limited to, e-mail, calendar events, voice mails, appointments, and task items. Algorithms or software may be executed upon processor 1002, such as the flow in FIG. 7. However in another example the flow in FIG. 7 can be realized completely by hardware.

Further applications may also be loaded onto the handheld electronic device 1052 through, for example, the wireless network 1050, the auxiliary I/O device 1038, data port 1028, short-range communications subsystem 1020, or any combination of these interfaces. Such applications are then able to be installed by a user in the RAM 1004 or a non-volatile store for execution by the microprocessor 1002.

In a data communication mode, a received signal such as a text message or web page download is processed by the communication subsystem, including wireless receiver 1012 and wireless transmitter 1010, and communicated data is provided the microprocessor 1002, which is able to further process the received data for output to the display 1034, or alternatively, to an auxiliary I/O device 1038 or the data port 1028. A user of the handheld electronic device 1052 may also compose data items, such as e-mail messages, using the keyboard 1036, which is able to include a complete alphanumeric keyboard or a telephone-type keypad, in conjunction with the display 1034 and possibly an auxiliary I/O device 1038. Such composed items are then able to be transmitted over a communication network through the communication subsystem.

For voice communications, overall operation of the handheld electronic device 1052 is substantially similar, except that received signals are generally provided to a speaker 1032 and signals for transmission are generally produced by a microphone 1030. Alternative voice or audio I/O subsystems, such as a voice message recording subsystem, may also be implemented on the electronic device 1052. Although voice or audio signal output is generally accomplished primarily through the speaker 1032, the display 1034 may also be used to provide an indication of the identity of a calling party, the duration of a voice call, or other voice call related information, for example.

Depending on conditions or statuses of the electronic device 1052, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1020 provides for data communication between the handheld electronic device 1052 and different systems or devices, which need not necessarily be similar devices. For example, the short-range communications subsystem 1020 includes an infrared device and associated circuits and components or a Radio Frequency based communication module such as one supporting Bluetooth®, or ZigBee® communications, to provide for communication with similarly-enabled systems and devices, including the data file transfer communications described above.

A media reader 1060 is able to be connected to an auxiliary I/O device 1038 to allow, for example, loading computer readable program code of a computer program product into the handheld electronic device 1052 for storage into flash memory 1006. One example of a media reader 1060 is an optical drive such as a CD/DVD drive, which may be used to store data to and read data from a computer readable medium or storage product such as computer readable storage media 1062. Examples of suitable computer readable storage media include optical storage media such as a CD or DVD, magnetic media, or any other suitable data storage device. Media reader 1060 is alternatively able to be connected to the electronic device through the Data port 1028 or computer readable program code is alternatively able to be provided to the handheld electronic device 1052 through the wireless network 1050.

In one example, the present invention is an interposer/cable or dongle that provides a USB 3.0 compatible connection from a USB 2.0 and HDMI connector. No additional connectors are needed to provide this additional communications standard. This allows product designers to keep the sleek, slim appearance of a device. The present invention also provides an intelligent multiplexer or switch. The multiplexer automatically selects inputs from either HDMI and USB 3.0 and PCIe to provide outputs to either HDMI or USB 2.0 or USB 3.0 or PCIE. Sensing the connected devices allows the correct type of communication port or bus to be provided automatically, while keeping the number of physical connectors needed to a minimum.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An electrical circuit connector, comprising:
   a first communication port is a Micro USB version 2.0 plug with a first pin out specification compatible with an Universal Serial Bus (USB) version 2.0 interface, and the first pin out electrically coupled to a first set of conductors;
   a second communication port is a Micro HDMI plug with a second pin out specification compatible with a High-Definition Multimedia Interface (HDMI) interface, and the second pin out electrically coupled to a second set of conductors; and
   a third communication port is a Micro USB version 3.0 interface receptacle with a third pin out specification compatible with an Universal Serial Bus (USB) version 3.0 linterface, and the third pin out electrically coupled to a third set of conductors, and the third set of conductors electrically coupled to at least a portion of both the first set of conductors and the second set of conductors.

2. The electrical circuit connector of claim 1, wherein the third set of conductors electrically coupled to the at least a portion of electrical conductors in both the first set of conductors and the second set of conductors are defined as Super-Speed conductors in the USB 3.0 standard.

3. An electronic device comprising:
   a switch with
      a set of bus inputs electrically coupled to at least a portion of:
         a first set of conductors compatible with a High-Definition Multimedia Interface (HDMI) interface;
         a second set of conductors compatible with an Universal Serial Bus (USB) version 3.0 interface; and
         a third set of conductors compatible with a Peripheral Component Interconnect Express (PCIe) interface;
      a bus output with a fourth set of conductors;
      a control input configured to receive a control signal to selectively couple one of the first set of conductors, the second set of conductors, and the third set of conductors to the fourth set of conductors of the bus output; and
   a HDMI compatible connector with HDMI conductors, and at least a portion of the HDMI conductors electrically coupled to the bus output, each of the first set of conductors compatible with a HDMI interface that are not HDMI data signals and not HDMI clock signals are electrically coupled to the HDMI conductors of the HDMI compatible connector without being routed through the switch.

4. The electronic device of claim 3, wherein the control input to receive the control signal is set to select the second set of conductors as the USB 3.0 interface in response to USB signal lines switching to a high voltage state.

5. The electronic device of claim 4, wherein the control input to receive the control signal is set to select the third set of conductors as the PCIe interface in response to receiving a response to a USB Get Descriptor request that PCIe is available on a host device.

6. The electronic device of claim 3, wherein the control input to receive the control signal is set to select the first set of conductors as the HDMI interface in response to USB signal lines remaining in a low voltage state.

7. The electronic device of claim 3, wherein the HDMI data signals and HDMI clock signals are CLK− and CLK+, D0− and D0+, D1− and D2+, and D2− and D2+.

8. The electronic device of claim 3, wherein the set of inputs electrically coupled to at least a portion of the second set of conductors compatible with the USB 3.0 interface, include only USB version 3.0 Superspeed conductors.

9. The electronic device of claim 3, wherein the set of inputs electrically coupled to at least a portion of the third set of conductors compatible with the PCIe interface, include one or more PCIe lanes comprising transmit differential pairs and receive differential pairs.

10. The electronic device of claim 8, wherein the USB version 3.0 Superspeed conductors are a transmitter differential pair and a receiver differential pair.

11. The electronic device of claim 8, wherein each of the first set of conductors compatible with a USB 3.0 interface that are not USB version 3.0 Superspeed conductors are electrically coupled to conductors of a USB 2.0 compatible connector without being routed through the switch.

12. The electronic device of claim 9, wherein the PCIe lanes comprise:
HSDp(0) for the transmit differential pairs and HSIp(0) for the receive differential pairs, defined as Lane 0; and
HSDp(1) for the transmit differential pairs and HSIp(1) for the receive differential pairs, defined as Lane 1.

13. The electronic device of claim 9, wherein each of the third set of conductors compatible with the PCIe interface that are not PCIe lanes are directly electrically coupled to the fourth set of conductors of the bus output without being routed through the switch.

14. A computer-implemented method comprising:
operating a selectable switch with at least two bus inputs, a bus output, and one or more control inputs to electrically couple one of the bus inputs to the bus output,
with one of the two bus inputs electrically coupled to at least a portion of a first set of High-Definition Multimedia Interface (HDMI) conductors compatible a HDMI interface;
with another one of the two bus inputs electrically coupled to at least a portion of a second set of USB conductors compatible with an Universal Serial Bus (USB) version 3.0 interface include only Superspeed transmitter differential pair and a receiver differential pair conductors or Peripheral Component Interconnect Express (PCIe) interface,
with at least a portion of the HDMI conductors in a HDMI compatible connector electrically coupled to the bus output; and
updating the control inputs to select one of the bus inputs based on capabilities of a peripheral device as reported through a USB 2.0 interface and an other of the two bus inputs that are not USB 3.0 interface Superspeed conductors are electrically coupled to conductors of a USB 2.0 compatible connector without being routed through the selectable switch.

15. The computer-implemented method of claim 14, wherein the selectable switch further comprises three bus inputs
with a first of the three bus inputs electrically coupled to at least a portion of the first set of conductors compatible the HDMI interface;
with a second of the three bus inputs electrically coupled to at least a portion of the second set of conductors compatible with the USB version 3.0 interface; and
with a third of the three bus inputs electrically coupled to at least a portion of a third set of conductors compatible with an PCIe interface.

16. The computer-implemented method of claim 14, wherein the other of the two bus electrically coupled to at least a portion of the third set of conductors compatible with the PCIe interface, include one or more PCIe lanes comprising transmit differential pairs and receive differential pairs.

17. The computer-implemented method of claim 15, wherein the one of the two bus inputs electrically coupled to at least a portion of the first set of conductors compatible with the HDMI interface, include HDMI data signals and clock signals.

18. The computer-implemented method of claim 16, wherein the PCIe lanes comprise:
HSDp(0) for the transmit differential pairs and HSIp(0) for the receive differential pairs, defined as Lane 0; and
HSDp(1) for the transmit differential pairs and HSIp(1) for the receive differential pairs, defined as Lane 1.

19. The computer-implemented method of claim 17, wherein the HDMI data signals and clock signals are CLK− and CLK+, D0− and D0+, D1− and D2+, and D2− and D2+.

20. The computer-implemented method of claim 18, wherein the other of the two bus electrically compatible with the PCIe interface that are not PCIe lanes are directly electrically coupled to the fourth set of conductors of the bus output without being routed through the switch.

21. The computer-implemented method of claim 19, wherein the one of the two bus inputs electrically coupled to at least a portion of the first set of conductors compatible with the HDMI interface that are not data signals and not clock signals are electrically coupled to the HDMI conductors of the HDMI compatible connector without being routed through the selectable switch.

* * * * *